INVENTORS.
SANFORD L. SIMONS
FREDERICK K. FLOYD
KIRK F. CARLSTEN
BY
Horace B. Van Valkenburgh
ATTORNEY Oct. 25, 1960   S. L. SIMONS ET AL   2,957,322
COUPLINGS Filed Feb. 26, 1959   3 Sheets-Sheet 2

INVENTORS.
SANFORD L. SIMONS
FREDERICK K. FLOYD
KIRK F. CARLSTEN
BY
Horace B. Van Valkenburgh
ATTORNEY Oct. 25, 1960 S. L. SIMONS ET AL 2,957,322
COUPLINGS
Filed Feb. 26, 1959 3 Sheets-Sheet 3

INVENTORS.
SANFORD L. SIMONS
FREDERICK K. FLOYD
KIRK F. CARLSTEN

BY
Horace B Van Valkenburgh
ATTORNEY

United States Patent Office 2,957,322
Patented Oct. 25, 1960

2,957,322
COUPLINGS

Sanford L. Simons, Turkey Creek, and Frederick K. Floyd and Kirk F. Carlsten, Denver, Colo., assignors to Metron Instrument Company, Denver, Colo., a corporation of Colorado Filed Feb. 26, 1959, Ser. No. 795,861

14 Claims. (Cl. 64—9)

This invention relates to couplings or devices adapted to connect two rotating shafts together.

Among the objects of this invention are to provide a novel shaft coupling; to provide such a coupling which will transmit power between two shafts with a minimum of power loss; to provide such a coupling which will not adversely affect the rotation of the two shafts connected thereby; to provide such a coupling which will cause the driven shaft to rotate through the same angle or number of turns as the driving shaft; to provide such a coupling which has a high degree of torsional rigidity; to provide such a coupling which will have little or no tendency to produce an increase in load on the bearings supporting either of the two shafts; to provide such a coupling which is particularly adapted to be made in relatively small sizes, such as to transmit torque of a foot pound or less but which may be made in larger sizes; to provide such a coupling which may connect two shafts which are disposed in angular misalignment, or the longitudinal axes of which may be offset, or a combination thereof; to provide such a coupling which may be used to connect two shafts which may move axially with respect to each other; and to provide such a coupling which is readily constructed and which will be efficient and effective in operation.

Additional objects and the novel features of this invention will become apparent from the description which follows, taken in connection with the accompanying drawings, in which.

Figure 1:
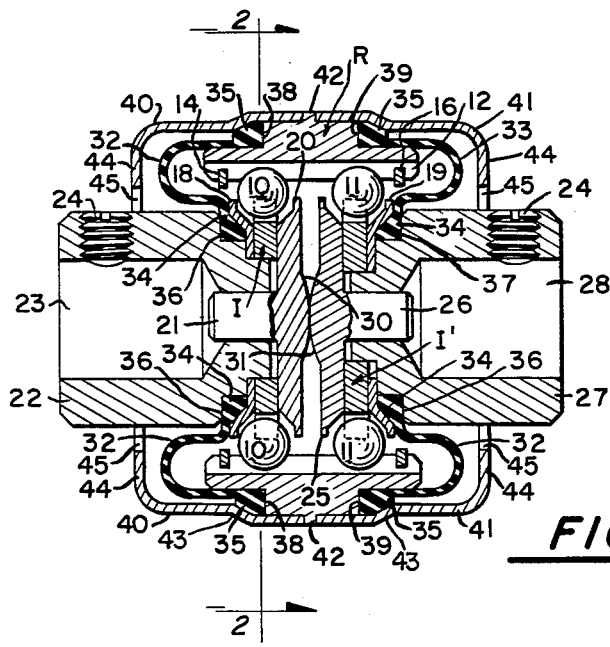
Fig. 1 is a longitudinal section of a coupling constructed in accordance with this invention.
Figure 2:
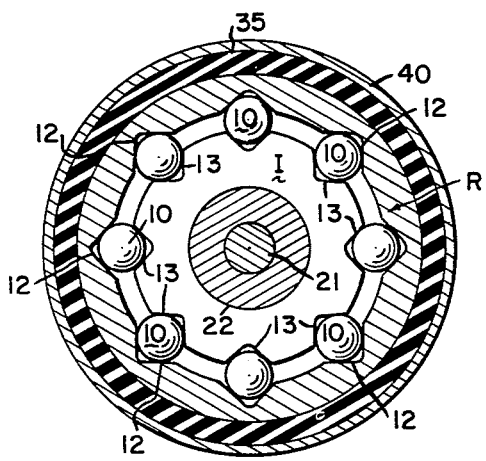
Fig. 2 is a transverse section taken along line 2—2 of Fig. 1.
Figure 3:
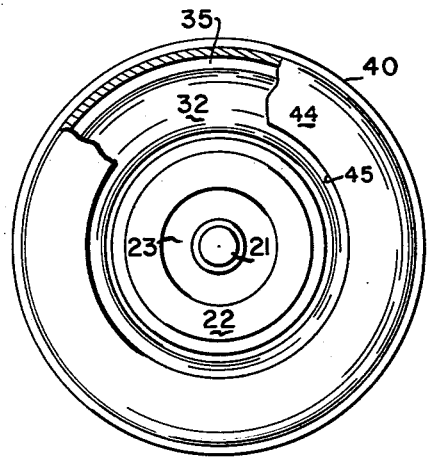
Fig. 3 is an end view of the coupling of Fig. 1.
Figure 4:
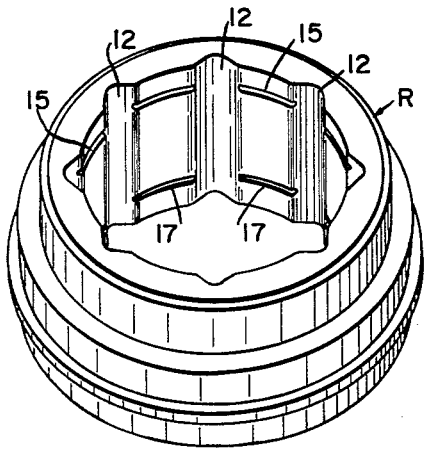
Fig. 4 is a perspective view of an outer race or ring forming a part of the coupling of Fig. 1.
Figure 5:
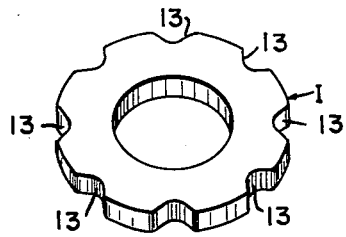
Fig. 5 is a perspective view of an inner race or ring, two of which are present in the coupling of Fig. 1.

As illustrated in Figs. 1–3, a coupling constructed in accordance with this invention may comprise two series of balls 10 and 11 engaging inner longitudinal grooves 12 and also outer longitudinal grooves 13 in a respective inner race or ring I or I'. Both sets of balls 10 and 11 engage the respective grooves 12 of outer race R, at spaced positions, while balls 10 engage the respective grooves 13 in one inner race I and balls 11 engage the respective grooves 13 in the opposite inner race I'. Preferably, grooves 12 and 13 are angular or V-shaped, as shown also in Figs. 4 and 5, so as to provide a point of contact of each ball with the opposite sides of each of the respective grooves, as in Fig. 2, although any other desired configuration of grooves 12 or 13 may be used. Outward movement of balls 10 along grooves 12 is limited by a snap ring 14, received in an annular groove 15 of outer race R, shown in Fig. 4, while outward longitudinal movement of balls 11 is limited by a snap ring 16, similarly received in an annular groove 17 in outer race R. The longitudinal movement outwardly of balls 10 in the respective grooves 13 of race I may be limited by an angularly offset stop ring 18, while longitudinal movement outwardly of balls 11 in the respective grooves 13 of inner race I' may be similarly limited by an angularly offset stop ring 19. Longitudinal movement inwardly of balls 10 in the respective grooves 13 of inner race I may be limited by an outer flange 20 of the head of a pin 21 extending into a central hole in the end of a hub 22, which may be provided with a socket 23 to receive a shaft to be connected thereto and a set screw 24 for clamping the hub to the shaft. Similarly, longitudinal movement inwardly of balls 11 in the respective grooves 13 of inner race I' may be limited by an outer flange 25 of the head of a pin 26 extending into a central hole in the inner end of a hub 27, provided with a socket 28 to receive a shaft to be connected thereto and a set screw 24 for clamping the hub to the shaft.

At its inner end, pin 21 may be provided with an inwardly extending abutment 30, preferably having the configuration of a spheroidal segment, while the inner end of pin 26 may also be provided at the center with a similar abutment 31. The abutments 30 and 31 are preferably spheroidal segments so that one abutment will roll on the other, when one pin pivots relatively to the other, thereby reducing to a minimum friction produced when the shafts attached to the respective hubs 22 and 27 rotate while disposed in angular misalignment, with their longitudinal axes offset, or a combination of both. The inner end of each of the respective pins 21 and 26 may be riveted over against the inside of the respective sockets 23 and 28, although in some installations the friction of the pins 21 and 26 in the holes engaged by them may suffice to hold the parts in position. If desired, particularly for larger sizes of couplings, a pin 21 or 26 may be threaded to engage corresponding threads in the hole in which it is inserted, or the outer end of a pin may be threaded and the pin held in position by a nut engaging such threads. At any rate, pins 21 and 26 must fit within hubs 22 and 27 tightly enough so that the pins produce sufficient frictional force upon the surfaces of inner races I and I' to prevent relative movement of the races on the hubs. Of course, races I and I' may also be keyed to hubs 22 and 27, respectively, or mounted on the hubs with a sufficiently tight fit to prevent relative rotation between the inner races and the hubs.

The balls 10 and 11 preferably operate in a suitable lubricant, such as oil or grease, which preferably fills the space around the balls and between the heads of the pins 21 and 26. Such lubricant may be retained within the coupling by flexible sealing rings 32 and 33, formed of suitable flexible and oil and grease resistant material, such as neoprene. Sealing rings 32 and 33 may be similar but complementary in configuration, each being generally semi-annular and provided with an inner thicker section or block 34 which may extend radially inwardly and an outer thicker section or block 35 which may extend axially inwardly, the blocks 34 and 35 having any suitable cross-sectional configuration, such as that shown. Inner block 34 of the respective seal ring may be held against a respective shoulder 36 or 37 of the respective hub 22 and 27 by the respective ring 18 or 19, while each outer block 35 of the respective seal ring engages an outer shoulder 37 or 38 of the outer race R, shoulders 38 and 39 facing in opposite directions. As will be evident, the inner edge of the respective seal ring 32 or 33 is clamped in position by the respective stop ring 18 or 19, the blocks 34 of the seal rings preferably having an angular surface corresponding to the angular portion of the respective stop ring 18 or 19. The outer edge of each seal ring 32 and 33 may be held in position by a generally cylindrical casing 40 or 41, respectively, each casing engaging the outer edge of the outer race R and abutting against opposite sides of a central stop flange 42 thereof. Each casing 40 and 41 may be provided with an angular step 43, so as to clamp the exterior of the outer block 35 of the respective seal ring 32 or 33, each outer block 35 having a corresponding configuration so that a wedging action will be produced. Each casing 40 and 41 may be provided with an outer, inwardly extending flange 44, having a hole 45 in the center sufficiently large to accommodate pivotal movement of hub 22 or 27, respectively, to the various angular positions which the respective hub assumes relative to the race R, as described later.

Figure 6:
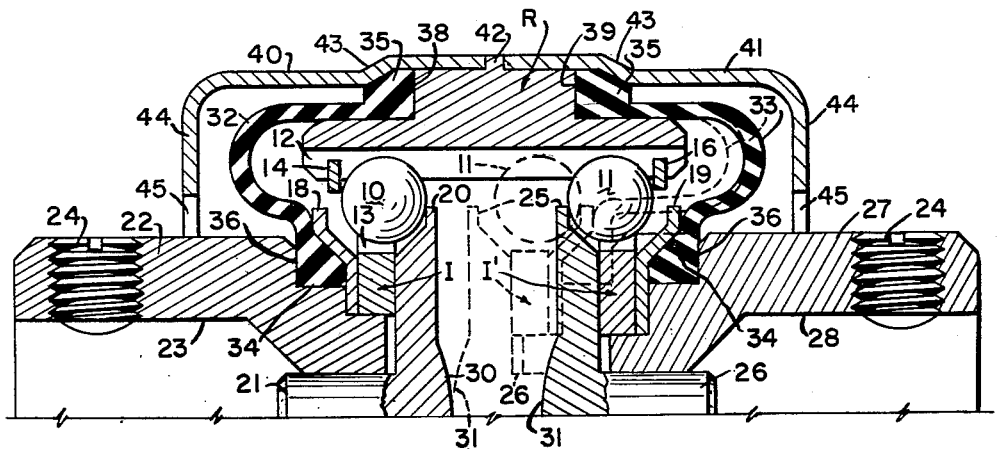
Fig. 6 is an enlarged fragmentary, longitudinal section similar to a portion of Fig. 1, illustrating the movement of a ball bearing in the grooves of the rings of Figs. 4 and 5.

With two shafts connected to the respective hubs 22 and 27, one usually being a driving shaft and the other a driven shaft, one or both of the shafts may move axially without affecting torque transmission or producing an undue load on the bearings supporting the shafts. While balls 10 and 11 normally assume a central position in the grooves 13 of the respective inner races I and I', the balls will move to a position contacting the respective stop ring 18 and 19 and the respective stop flange 20 and 25, as shown in full in Fig. 6 for a ball 10 and a ball 11, when the shafts are in axial alignment, but one or both shafts move axially. Thus, balls 10 or 11, as the case may be, or both, will merely roll along the grooves 12 and 13. Of course, the axial movement of either or both shafts toward each other is limited by engagement of the abutments 30 and 31, while movement of one or both shafts away from each other may extend to the position shown in Fig. 6. When one or both shafts are then moved axially toward the other, as when the shaft connected to the hub 27 of Fig. 6 is moved to a position corresponding to the dotted positions of Fig. 6 of stop ring 19, inner race I' and stop flange 25, i.e., when abutments 30 and 31 are again in engagement, balls 11 will tend to be moved to the dotted position of Fig. 6, i.e., into engagement with the stop ring 19. Similarly, if the shafts are apart and the shaft connected to hub 22 is moved toward the opposite shaft, balls 10 will tend to be moved toward stop ring 18, in a similar manner. Thus, considerable axial movement of the shafts relative to each other may take place, but such movement does not unduly affect the torque transmitted by the coupling, since balls 10 and 11, due to their spherical shape, will merely roll along grooves 12 of outer race R and also along grooves 13 of the respective inner race I or I'. Thus, friction is reduced to a minimum and relative movement between one and the other hub, or between outer race R and either hub, will not unduly decrease the torque transmitted through friction loss in the coupling. Furthermore, since the balls each engage the grooves in the inner races and the outer race at all times, there is no diminution in the torque transmitted by the coupling, irrespective of the position of the balls in the respective groove.

Figure 7:
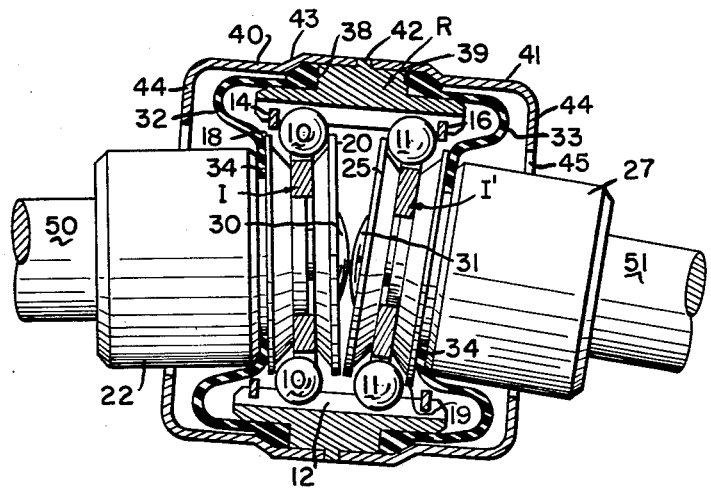
Fig. 7 is a side elevation, partly in longitudinal section, illustrating the action of the coupling parts when connecting two shafts whose longitudinal axes are angularly misaligned.

In the event that the shafts are misaligned angularly, as in Fig. 7, wherein a shaft 50 is attached to hub 22 and a shaft 51 is attached to hub 27, as the coupling rotates the balls will merely shift along the grooves without diminution of the torque transmitted and, due to the rolling action in the grooves, without appreciable friction which would unduly reduce the efficiency of the coupling. Assuming that the centerline of shaft 51 makes an angle of 10° with an extension of the center line of shaft 50, as shown, the outer race R together with the casings 40 and 41, will assume a position centrally therebetween, such as an angle of 5° to each shaft. Although Fig. 7 illustrates only an instantaneous position of the shafts and coupling, in general the outer race R and casings 40 and 41 will rotate in the same plane continuously, while each of hubs 22 and 27 and the parts attached thereto will rotate in a plane determined by the shaft to which the respective hub is attached. Thus, the only relative movement which takes place during rotation of shaft 51 by shaft 50 through the coupling, or vice versa, will be a shifting of the balls 10 and 11 along the respective grooves and a flexing of the seal rings 32 and 33. For instance, each ball 10 during one revolution will move between the position of the lower ball 10 shown, to the position of the upper ball 10 shown, and thence back to the position of the lower ball 10. Similarly, each ball 11 during one revolution will move between the position of the lower ball 11 shown, to the position of the upper ball 11 shown, and thence back to the position of the lower ball 11 shown. As will be evident, the balls 10 and 11 are further apart in the upper position shown and closer together in the lower position shown, which will be the situation when the angular misalignment of the shafts is in a vertical plane, while for angular misalignment in any other plane, balls 10 and 11 will be further apart at the position in which the center line between the shafts makes the greatest obtuse angle and will be closest together at the opposite position, i.e., in which the center line between the shafts makes the smallest acute angle. It will be noted that in the position farthest apart, i.e., the upper position of balls 10 and 11 shown, each ball 10 has moved inwardly in its groove 13 to abut against the inner stop flange 20 and also outwardly in the corresponding groove 12 in the outer race to abut against stop ring 14. Similarly, the upper ball 11 has moved inwardly in its groove 13 to abut against the inner stop flange 25 and outwardly in groove 12 to abut against stop ring 16. With abutments 30 and 31 in engagement, as shown in Fig. 7, the upper positions of the balls 10 and 11 determine the maximum angular misalignment of the shaft which can be accommodated by the coupling. As will be evident, as a ball 10 moves from the upper position to the lower position shown in Fig. 7, it will roll inwardly along groove 12 of outer race R and outwardly along groove 13 of inner ring I until it reaches stop ring 18. Similarly, as a ball 11 moves from the upper to the lower position of Fig. 7, it will move inwardly along groove 12 and outwardly along groove 13 until it reaches the stop ring 19. Thus, as each ball 10 or 11 moves around the coupling, the balls will merely move inwardly and outwardly along the respective grooves 12 and 13, in the manner described above. Since abutments 30 and 31 are preferably spheroidal segments, they merely roll on each other, which does not tend to produce a significant amount of friction, while the rolling movement of the balls along the grooves produces a minimum of friction. In addition, the lubricant within the space occupied by the segments 30 and 31 and balls 10 and 11, which lubricant also fills grooves 12 and 13, reduces to a minimum the friction produced by the balls and segments. While the flexing of the seal rings 32 and 33 may require some force, this is reduced to a minimum when the seal rings are made of highly flexible material and are also provided with a generally central semi-circular configuration which is maintained by the inner edge being merely pulled inwardly relative to the outer edge, when moving from the upper to the lower position of Fig. 7, and vice versa when moving from the lower to the upper position. Stated in another manner, in the case of each seal ring 32 and 33, a substantially semi-circular portion will be maintained in the approximate center, with relatively straight portions connecting the semi-circular portion with each of the respective hub and outer race and these straight portions will merely increase and decrease in extent as the seal ring is rotated. Thus, the force required to flex the seal rings is held to a minimum.

Figure 8:
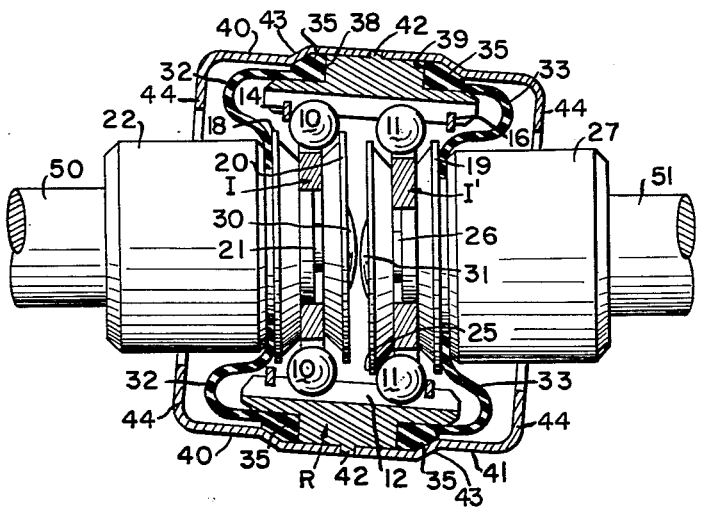
Fig. 8 is a similar side elevation, illustrating the action of the coupling parts when connecting two shafts whose longitudinal axes are offset.

When shafts 50 and 51 are parallel but offset, as shown in Fig. 8, the outer race R is again inclined with respect to the center line of each of the shafts and rotates in that plane as the shafts rotate. However, in the position shown, the upper ball 10 is in its maximum outer position, i.e., against both outer stop ring 14 and inner stop flange 20, while lower ball 11 is in its maximum outer position, i.e., against both outer stop ring 16 and inner stop flange 25. As will be evident, when a ball 10 moves from the upper position to the lower position of Fig. 8, it will roll outwardly along groove 13 of inner race I and inwardly along groove 12 of outer race R. Similarly, when a ball 11 moves from the lower position of Fig. 8 to the upper position shown, it will roll outwardly along groove 13 of inner race I' and inwardly along groove 12 of outer race R. In each case, if shafts 50 and 51 are offset the maximum amount which may be accommodated by the coupling, a ball 10 in the lower position will engage the stop ring 18 and a ball 11 in the upper position will engage the stop ring 19. It will be understood, of course, that while the offset of shafts 50 and 51 is shown in Fig. 8 as being in a vertical plane, the coupling may accommodate an offset in any plane. Also, the coupling will accommodate a combination of angular misalignment and offset, to an extent depending upon the position of outer race R relative to the axes of the respective shafts. In some instances, the angular misalignment may compensate for a portion of the offset, but in other cases the angular misalignment may be cumulative, so that the degree of combined offset and angular misalignment which can be accommodated may be dependent upon the direction of the angular misalignment relative to the offset.

As will also be evident from Fig. 6, each of the seal rings 32 and 33 will accommodate axial separation of the hubs and shaft, the central portion of each seal ring again remaining generally semicircular in cross section. Also, as shown by the dotted position of seal ring 33 in Fig. 6, when one shaft and hub is moved inwardly toward the opposite hub, the central portion of the seal ring will still be generally semicircular, particularly since the outer portion of the seal ring adjacent the central portion, which is preferably disposed generally parallel to the axis of the hub when the shafts are in alignment, will merely increase or decrease as the hub is moved inwardly or outwardly relatively to the outer race. Thus, in the dotted position shown, the outer straight portion of the seal ring has a lesser longitudinal extent than in the full position, but in the dotted position shown, the inner portion of the seal ring which is generally parallel to the axis of the hub with the shafts in alignment, has a greater extent than in the full position. Thus, the inner generally straight portion will decrease or increase in extent corresponding to an increase or decrease, respectively, of the outer generally straight portion.

From the foregoing, it will be evident that a coupling constructed in accordance with this invention fulfills to a marked degree the requirements and objects hereinbefore set forth. The seal rings are provided with central portion which are generally semi-circular in radial cross section and permit either hub to shift relative to the outer race, without producing an undue power loss due to flexing of a seal ring. Since the seal rings enclose a lubricant within the space in which balls 10 and 11 operate, as well as the abutments 30 and 21, friction losses are reduced to a minimum. Also, casings 40 and 41 protect the seal rings from damage, due to impact or blows. The coupling will also have a high degree of torsional rigidity, since each ball will always remain in contact with the corresponding grooves and the balls will merely roll along the grooves. Since the hubs may shift relative to each other and to the outer race quite readily, there is little or no tendency of the coupling to product an increase in load on a bearing supporting either of the shafts to which the hubs are connected. The abutments, which are preferably formed as generally spheroidal segments, also produce a minimum of resistance to rotation, since the abutments will roll around each other with the shafts in angular misalignment while one abutment will, in effect, roll around the other abutment or vice versa, with the shafts in lateral or offset misalignment, i.e., with the axes of the shafts parallel but spaced apart. Also any combination of angular misalignment and offset of the axes will not increase the resistance to rotation, since the abutments will offer a minimum of resistance. The coupling of this invention may also be constructed economically, since the inner and outer races are readily made, while the pins which provide the inner stop flanges and are merely inserted axially into the hub, simplify the assembly as well as the formation of parts. Also, the stop rings not only prevent the balls from moving too far in the respective inner race, but also conveniently clamp the inner edge of the respective seal ring to the hub. The annular thicker section at each of the inner and outer edges of the seal rings permits the respective edge of the seal ring to be clamped securely to the hub or the outer race, while the casing also performs a useful purpose in clamping the seal rings to the outer race, as well as protecting the outer race.

Although a preferred embodiment of this invention has been illustrated and described, it will be understood that other embodiments may exist and various changes and variations made without departing from the spirit and scope of this invention.

What is claimed is:

1. A coupling comprising a pair of hubs, each provided with means for connection to a shaft and an inner race having circumferentially spaced, longitudinal grooves; an outer race provided with circumferentially spaced, longitudinal grooves around the inner periphery thereof; a series of balls disposed in the respective grooves of each inner race and extending into corresponding grooves of said outer race; and each said hub being provided with a central abutment facing the opposite hub, each said abutment having generally the form of a spheroidal segment and having a flange extending outwardly past the inner race grooves of the respective hub.

2. A coupling as defined in claim 1, wherein each said abutment is provided with a stem extending into a hole in said hub.

3. A coupling as defined in claim 1, wherein each said inner race is provided by a ring held in position by said flange.

4. A coupling comprising a pair of hubs, each provided with means for attachment to a shaft and an inner race provided with circumferentially spaced, longitudinal grooves; an outer race provided with circumferentially spaced, longitudinal grooves around the inner periphery thereof; a series of balls disposed in the respective grooves of each inner race and extending into corresponding grooves of said outer race; and a seal ring formed of flexible material for each said hub, each said seal ring extending from said hub to the adjacent end of said outer race, and each said seal ring having a central portion which is normally generally semicircular in radial cross section and is concave on the side adjacent the outer race.

5. A coupling as defined in claim 4, including means for attaching each seal ring to the corresponding end of said outer race with the portion of said seal ring adjacent to said semicircular portion extending generally parallel to the axis of said hub with said shafts in alignment.

6. A coupling as defined in claim 4, wherein each of the inner and outer edges of each said seal ring is provided with an annular block having a thickness greater than the thickness of said semicircular portion; and means for clamping said block to the corresponding hub and to outer race.

7. A coupling comprising a pair of hubs, each provided with means for connection to a shaft and an inner race provided with circumferentially spaced, longitudinal grooves; an outer race provided with circumferentially spaced, longitudinal grooves around the inner periphery thereof; a series of balls disposed in the respective grooves of each inner race and also extending into the corresponding grooves of said outer race; a seal ring formed of flexible material connecting each said hub with said outer race; and a ring for clamping the inner edge of each said seal ring to the corresponding hub, each said clamping ring being provided with an outwardly extending flange providing a stop for the balls in the grooves of said inner race.

8. A coupling comprising a pair of hubs, each provided with a socket and means for attaching a shaft extending into said socket to the corresponding hub, each said hub being provided with a hole extending axially into said socket from the inner end of said hub; an inner race for each said hub mounted on said hub at the inner end thereof and provided with circumferentially spaced, longitudinal grooves; an outer race provided with circumferentially spaced, longitudinal grooves around the inner periphery thereof; a series of balls disposed in the respective grooves of each said inner race and extending into the corresponding grooves of said outer race; and a pin for each said hub provided with a stem extending into said hole, each said pin being provided with an outwardly extending flange abutting against said inner race to hold said inner race in position.

9. A coupling as defined in claim 8, wherein each said pin is provided with an abutment disposed centrally thereof and facing the opposite hub, each said abutment being formed generally as a spheroidal segment.

10. A coupling as defined in claim 9, including a ring disposed between each said inner race and said hub, each said ring having an angularly and outwardly extending flange providing a stop for the balls in the grooves of said inner race, the flange of each said pin extending outwardly beyond said grooves to provide a stop for said ball opposite said stop rings.

11. A coupling as defined in claim 10, including annular stop rings for said balls mounted on the inside of said outer race adjacent the respective ends of said grooves.

12. A coupling as defined in claim 11, including a sealing ring connecting each said hub with said outer race, each said sealing ring having a central portion which is generally semi-circular in radial cross section and the inner edge of each said seal ring being clamped to said hub by said stop ring.

13. A coupling as defined in claim 12, including a casing mounted on each end of said outer race and disposed outwardly from and extending axially beyond the corresponding sealing ring, each end of said casing being provided with a depending flange having a central aperture providing clearance for angular movement of the corresponding hub.

14. A coupling as defined in claim 13, wherein the inner and outer edge of each said sealing ring is provided with an annular block having a thickness greater than the central portion of said sealing ring, the inner block of each sealing ring being clamped by said stop ring to said hub and the outer block of each sealing ring being clamped by said casing to said outer race.

References Cited in the file of this patent

UNITED STATES PATENTS

| 1,861,364 | Schreck | May 31, 1932 |
| 1,972,779 | Kradoska | Sept. 4, 1934 |
| 2,426,701 | Miller | Sept. 2, 1947 |
| 2,873,588 | Crankshaw | Feb. 17, 1959 |

FOREIGN PATENTS

| 377,761 | Great Britain | Aug. 4, 1932 |